United States Patent
Kataoka et al.

(10) Patent No.: US 10,144,162 B2
(45) Date of Patent: Dec. 4, 2018

(54) METHOD OF MANUFACTURING CABLE WITH RESIN MOLDED BODY

(71) Applicant: Hitachi Metals, Ltd., Tokyo (JP)

(72) Inventors: Yuta Kataoka, Hitachi (JP); Yukio Ikeda, Hitachi (JP); Takashi Onimoto, Hitachi (JP)

(73) Assignee: HITACHI METALS, LTD., Tokyo (JP)

( * ) Notice: Subject to any disclaimer, the term of this patent is extended or adjusted under 35 U.S.C. 154(b) by 504 days.

(21) Appl. No.: 14/739,805

(22) Filed: Jun. 15, 2015

(65) Prior Publication Data
US 2015/0360402 A1 Dec. 17, 2015

(30) Foreign Application Priority Data

Jun. 17, 2014 (JP) ................................. 2014-124433

(51) Int. Cl.
*B29C 45/00* (2006.01)
*H01B 13/06* (2006.01)
(Continued)

(52) U.S. Cl.
CPC ......... *B29C 45/0025* (2013.01); *H01B 13/06* (2013.01); *B29C 45/0046* (2013.01);
(Continued)

(58) Field of Classification Search
None
See application file for complete search history.

(56) References Cited

U.S. PATENT DOCUMENTS

| 5,633,062 A | 5/1997 | Saito et al. |
| 6,358,456 B1 | 3/2002 | Takahashi |
| (Continued) | | |

FOREIGN PATENT DOCUMENTS

| JP | H 11-300786 A | 11/1999 |
| JP | 2005-227177 A | 8/2005 |
| (Continued) | | |

OTHER PUBLICATIONS 3D systems, Basics of Injection Molding Design, https://www.3dsystems.com/quickparts/learning-center/injection-molding-basics#gates, Published on Dec. 2, 2010, Retrieved Nov. 10, 2017 (Year: 2010).*

(Continued)

*Primary Examiner* — Francisco W Tschen
(74) *Attorney, Agent, or Firm* — McGinn I.P. Law Group, PLLC

(57) ABSTRACT

A method of manufacturing a cable with resin molded body, wherein the cable with resin molded body includes a cable and a resin molded body formed by resin molding, wherein the resin molded body includes a main body to cover the tip portion of the cable and a flange integrally molded with the main body, and wherein the flange includes a bolt hole through which a bolt is inserted so as to fix the flange to the attachment object. The method includes molding the resin molded body by injecting a resin into a mold, the mold including a main body-molding portion for molding the main body, a flange-molding portion for molding the flange and an outlet formed behind the flange-molding portion in relation to the main body-molding portion, and draining the resin through the outlet during the molding of the resin molded body.

16 Claims, 3 Drawing Sheets

(51) Int. Cl.
   *B29K 75/00*    (2006.01)
   *B29K 67/00*    (2006.01)
   *B29L 31/34*    (2006.01)
   *B29C 45/14*    (2006.01)

(52) U.S. Cl.
   CPC .. *B29C 45/14426* (2013.01); *B29C 45/14467* (2013.01); *B29K 2067/006* (2013.01); *B29K 2075/00* (2013.01); *B29L 2031/3462* (2013.01)

(56) References Cited

U.S. PATENT DOCUMENTS

| | | | |
|---|---|---|---|
| 7,421,909 | B2 | 9/2008 | Tsuge |
| 2006/0260418 | A1 | 11/2006 | Tsuge |
| 2007/0187869 | A1* | 8/2007 | Bierslaker ......... B29C 45/14073 264/265 |
| 2010/0086637 | A1* | 4/2010 | Nakata ............... B29C 45/0025 425/567 |
| 2011/0031647 | A1* | 2/2011 | Nakata ............. B29C 45/14434 264/265 |
| 2013/0104842 | A1* | 5/2013 | Weldon ................... H02K 5/08 123/339.27 |

FOREIGN PATENT DOCUMENTS

| | | |
|---|---|---|
| JP | 4487851 B2 | 6/2010 |
| JP | 2012-088103 A | 5/2012 |
| JP | 2013-142600 A | 7/2013 |
| NL | 1033143 C1 | 11/2007 |

OTHER PUBLICATIONS

Chinese Office Action in Chinese Application No. 2015-10328908.X dated May 31, 2017 with a partial English translation thereof.
Japanese Office Action dated Aug. 8, 2017 in Japanese Application No. 2014-124433 with an English translation thereof.
Extended European Search Report dated Oct. 23, 2015.
Shoemaker, Jay, et al. "Moldflow Design Guide a Resource for Plastics Engineers", Dec. 31, 2006, XP055132560, Retrieved from the Internet: URL: http://marciaswan.weebly.com/uploads/1/3/5/8/13585698/mfdg_low-res_proof_part1.pdf.
"A Design Guide Part and Mold Design Engineering Polymers", ' Dec. 30, 2000 (Dec. 30, 2000), XP055136292, Retrieved from the Internet: URL:http:jjedge.rit.edujcontent/P12856/public/Part and Mold Design.pdf.
Japanese Office Action dated Feb. 6, 2018 in corresponding Japanese Patent Application No. 2014-124433 with an English translation thereof.

* cited by examiner

METHOD OF MANUFACTURING CABLE WITH RESIN MOLDED BODY

The present application is based on Japanese patent application No. 2014-124433 filed on Jun. 17, 2014, the entire contents of which are incorporated herein by reference.

BACKGROUND OF THE INVENTION

1. Field of the Invention

The invention relates to a method of manufacturing a cable with resin molded body.

2. Description of the Related Art

A cable with resin molded body is known in which the resin molded body is formed by resin molding so as to cover a tip portion of the cable.

The cable with resin molded body is configured such that the resin molded body is formed to cover the tip portion of the cable and a member connected thereto (a sensor portion or a terminal etc.) all together and waterproof properties are provided by adhering the resin molded body to a covering of the cable (an insulation formed on the outermost periphery of the cable).

A cable with resin molded body 41 as shown in FIGS. 4A and 4B is known in which a resin molded body 44 has a main body 45 provided to cover a tip portion of a cable 42 as well as a sensor portion 43 and a flange 46 integrally molded with the main body 45 and used to fix the resin molded body 44 to an attachment object. The flange 46 has a bolt hole 47 through which a bolt is inserted so as to fix the flange 46 to the attachment object.

The resin molded body 44 is formed by resin molding as shown in FIG. 4C, the cable 42 and the sensor portion 43 are arranged in a mold 48 and a resin is then injected through a resin inlet 49.

In the conventional method of manufacturing the cable with resin molded body, the resin inlet 49 is formed on the mold 48 at a position facing an end portion of a covering 42a of the cable 42 so that the resin molded body 44 is adhered to the covering 42a of the cable 42. A high-temperature resin injected from the resin inlet 49 toward the covering 42a of the cable 42 softens the covering 42a which is then adhered to the resin molded body 44, thereby providing waterproof properties.

The cable with resin molded body 41 having the sensor portion 43 in the resin molded body 44 is used for ABS sensors, torque sensors and index sensors etc.

The prior art documents related to the present invention may be e.g. JP-A-2013-142600 and JP-B-4487851.

SUMMARY OF THE INVENTION

In forming the cable with resin molded body 41, however, since the resin is injected from a position facing the covering 42a of the cable 42 at the base end portion of the main body 45, the injected resin flows around both sides of the bolt hole 47 at the flange 46 as indicated by arrows in FIGS. 4B and 4C and a weld (weld line) 50 may be formed at a position where the two resin flows meet again. If the weld 50 remains around the bolt hole 47, a crack may occur from the weld 50 when tightening the bolt.

It is an object of the invention to provide a method of manufacturing a cable with resin molded body that prevents the crack when tightening the bolt.

(1) According to one embodiment of the invention, a method of manufacturing a cable with resin molded body, wherein the cable with resin molded body comprises a cable and a resin molded body formed by resin molding so as to cover a tip portion of the cable, wherein the resin molded body comprises a main body to cover the tip portion of the cable and a flange to fix the resin molded body to an attachment object, the flange being integrally molded with the main body, and wherein the flange comprises a bolt hole through which a bolt is inserted so as to fix the flange to the attachment object, comprises:

molding the resin molded body by injecting a resin into a mold, the mold comprising a main body-molding portion for molding the main body, a flange-molding portion for molding the flange and an outlet formed behind the flange-molding portion in relation to the main body-molding portion; and draining the resin through the outlet during the molding of the resin molded body.

In the above embodiment (1) of the invention, the following modifications and changes can be made.

(i) The outlet is formed in communication with a part of the flange-molding portion across the bolt hole from the main body-molding portion, and wherein the resin is drained through the outlet during the molding of the resin molded body.

(ii) The outlet comprises a diameter smaller than a thickness of the flange.

(iii) The outlet comprises a diameter of not more than 1 mm.

(iv) The outlet is formed at an intermediate position in a thickness direction of the flange-molding portion.

(v) The mold further comprises a first resin inlet formed at a position of a base end portion of the main body-molding portion corresponding to a covering of the molded cable, and wherein the resin is injected through the first resin inlet into the mold during the molding of the resin molded body.

(vi) The mold further comprises a second resin inlet formed at a top end portion of the main body-molding portion opposite the cable, and wherein the resin is further injected through the second resin inlet into the mold during the molding of the resin molded body.

(vii) The resin molded body is formed so as to cover a periphery of a sensor at the tip portion of the cable.

Effects of the Invention

According to one embodiment of the invention, a method of manufacturing a cable with resin molded body can be provided that prevents the crack when tightening the bolt.

BRIEF DESCRIPTION OF THE DRAWINGS

Next, the present invention will be explained in more detail in conjunction with appended drawings, wherein.

DETAILED DESCRIPTION OF THE PREFERRED EMBODIMENTS

The embodiment of the invention will be described below in conjunction with the appended drawings.

Figure 1A:
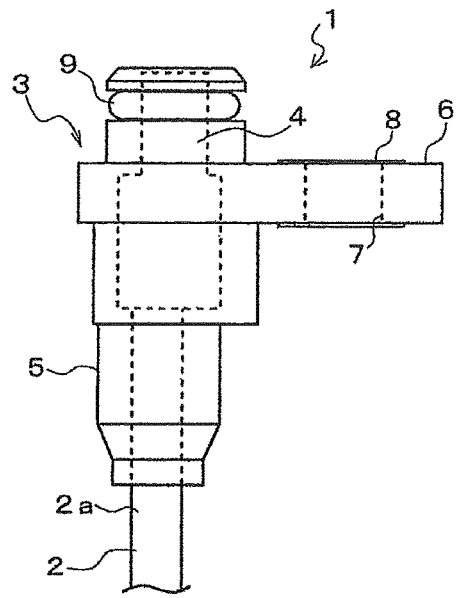
FIG. 1A is a side view showing a cable with resin molded body in an embodiment of the invention.
Figure 1B:
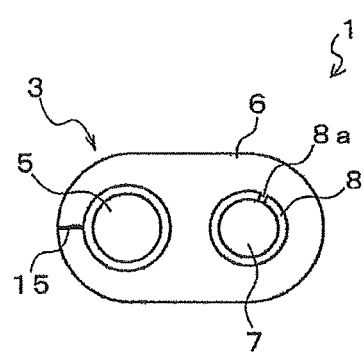
FIG. 1B is a top view of the cable in FIG. 1A.
Figure 1C:
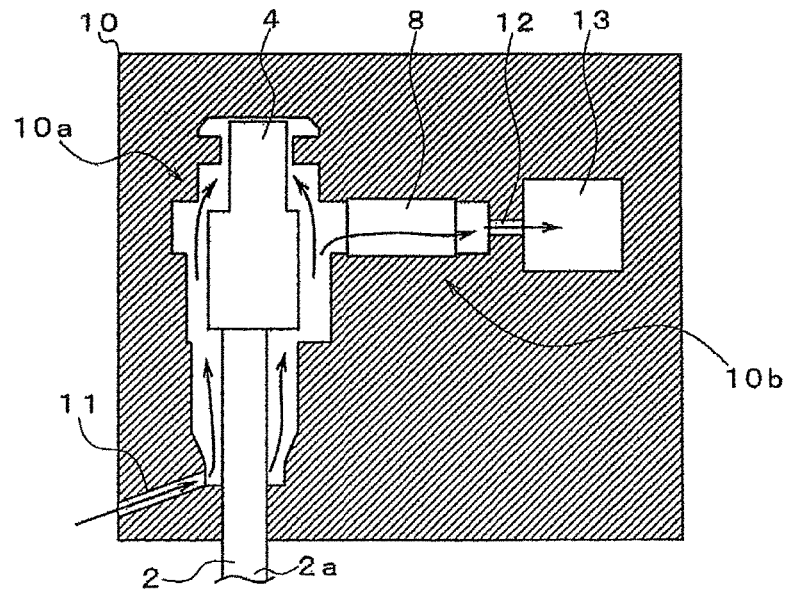
FIG. 1C is an illustration diagram showing a method of manufacturing the cable with resin molded body in the embodiment.

FIG. 1A is a side view showing a cable with resin molded body in the present embodiment, FIG. 1B is a top view thereof and FIG. 1C is an illustration diagram showing a method of manufacturing a cable with resin molded body in the present embodiment.

As shown in FIGS. 1A and 1B, a cable with resin molded body 1 is provided with a cable 2 and a resin molded body 3 formed by resin molding so as to cover a tip portion of the cable 2.

The resin molded body 3 is formed to cover an end portion of a covering 2a of the cable 2 and waterproof properties are provided by adhering the covering 2a to the resin molded body 3. In this embodiment, a sensor portion 4 is provided at a tip of the cable 2 and the resin molded body 3 is provided to cover the sensor portion 4 as well as the tip portion of the cable 2.

The covering 2a of the cable 2 is formed of urethane or PBT (polybutylene terephthalate). The resin molded body 3 needs to be formed of a material which can be adhered to the covering 2a. Thus, the resin molded body 3 is formed of nylon when using urethane to form the covering 2a and is formed of PBT when using PBT to form the covering 2a.

The resin molded body 3 has a main body 5 and a flange 6. The main body 5 is provided to cover the tip portion of the cable 2 as well as the sensor portion 4. The flange 6 is integrally molded with the main body 5 and is used to fix the resin molded body 3 to an attachment object (not shown).

The main body 5 is formed to cover the entire region from the end portion of the covering 2a of the cable 2 to the top end portion of the sensor portion 4. Alternatively, a portion of the sensor portion 4 on the top end portion side may be exposed from the main body 5.

The flange 6 is provided to extend from one side of the main body 5. The flange 6 extends in a direction perpendicular to an extending direction of the cable 2 (a direction along the central axis of the sensor portion 4).

The flange 6 has a bolt hole 7 through which a bolt is inserted to fix the flange 6 to the attachment object. In the bolt hole 7, a ring-shaped metal collar 8 is provided along an inner peripheral surface of the bolt hole 7. The collar 8 is formed by rolling a plate-shaped metal. Therefore, a slit 8a is formed along the axial direction of the collar 8 (a thickness direction of the flange 6).

In the present embodiment, the main body 5 is configured that the top end portion (a portion opposite to the cable 2 and beyond the flange 6) is inserted into a hole formed on the attachment object. Therefore, an O-ring 9 is provided at the top end portion of the main body 5 to provide waterproof properties between the main body 5 and an inner wall of the hole into which the main body 5 is inserted.

The cable with resin molded body 1 is used as e.g. an ABS sensor, a torque sensor or an index sensor etc. However, the intended purpose of the cable with resin molded body 1 is not limited thereto.

Next, a method of manufacturing a cable with resin molded body in the present embodiment will be described.

In the method of manufacturing a cable with resin molded body in the present embodiment, the sensor portion 4 is firstly attached to a tip of the cable 2, and the cable 2 and the sensor portion 4 are then placed in a mold 10. A holder may be additionally provided to cover a connecting portion of the cable 2 to the sensor portion 4, etc., so that wire breakage or positional shift due to the resin flow is prevented. The pre-made collar 8 is also placed in the mold 10. The mold 10 is provided with a main body-molding portion 10a for molding the main body 5 and a flange-molding portion 10b for molding the flange 6.

In the present embodiment, a first resin inlet 11 for injecting a resin is formed on the body-molding portion 10a at a position facing the covering 2a of the cable 2. Thus, a resin is injected from the base end portion of the body-molding portion 10a through the inlet located at the position facing the covering 2a of the cable 2.

Since the resin is injected from the inlet located at a position facing the covering 2a of the cable 2, the covering 2a is exposed to the high-temperature resin for a long time and is softened and adhered to the resin molded body 3, and waterproof properties are thereby provided. The direction of injecting the resin is desirably slightly inclined toward the top end portion of the main body 5 so that the resin flows more smoothly.

In the method of manufacturing a cable with resin molded body in the present embodiment, an outlet 12 for draining the resin is formed on the flange-molding portion 10b on the bolt hole 7 side with respect to the main body-molding portion 10a, so that the resin is drained from the flange-molding portion 10b through the outlet located on the bolt hole 7 side with respect to the main body-molding portion 10a during resin molding of the resin molded body 3.

Draining the resin from the flange-molding portion 10b through the outlet located on the bolt hole 7 side with respect to the main body-molding portion 10a allows the resin to flow around the bolt hole 7 of the flange-molding portion 10b, thereby preventing a weld from being formed around the bolt hole 7.

In the present embodiment, a resin reservoir 13 is formed in communication with the outlet 12 so that the resin is drained from the outlet 12 to the resin reservoir 13 during the resin molding process.

In order to more reliably prevent a weld from being formed around the bolt hole 7, it is preferable that the resin be drained from a position further from the main body 5, and it is more preferable that the resin be drained from the flange-molding portion 10b through a gate located at a position facing the main body-molding portion 10a via the bolt hole 7 (a portion of the flange-molding portion 10b opposite to the main body-molding portion 10a with respect to the central axis of the bolt hole 7). In the present embodiment, the outlet 12 is formed on the flange-molding portion 10b at a position facing the main body-molding portion 10a via the bolt hole 7 (i.e., a position which is farthest from the main body 5 and at which a weld is formed in the conventional technique). Therefore, the resin is drained from the flange-molding portion 10b through the outlet located at a position facing the main body-molding portion 10a via the bolt hole 7 during resin molding of the resin molded body 3.

Meanwhile, since weld formation around the outlet 12 can be further prevented by creating a complicated resin flow around the outlet 12, it is desirable that a diameter of the outlet 12 is as small as possible. The diameter of the outlet 12 is desirably at least smaller than the thickness of the flange 6 and is desirably not more than 1 mm in concrete terms. In addition, the outlet 12 is desirably formed at the middle portion of the flange-molding portion 10b in a thickness direction to prevent the resin flow from becoming significantly different between front and back sides of the flange-molding portion 10b.

The mold 10 has a divided structure in order to take out the resin molded body 3 after molding and the dividing direction is desirably a direction parallel to the plane of FIG. 1C. In this configuration, it is possible to form the outlet 12 and the resin reservoir 13 only by forming grooves on division surfaces of the mold 10 (surfaces of the divided halves of the mold 10 to be joined) and it is thus easy to make the mold 10.

As indicated by arrows in FIGS. 1B and 1C, the resin injected from the first resin inlet 11 flows from the base end toward the top end portion of the main body-molding portion 10a. Then, a portion of the resin branches off along the way, passes through the flange-molding portion 10b and is drained to the resin reservoir 13 through the outlet 12.

In the present embodiment, it is necessary to continue to inject the resin until the resin is drained from the outlet 12 to the resin reservoir 13. Therefore, considering the amount of the resin to be drained, the amount of the resin injected from the first resin inlet 11 needs to be more than the amount of the resin actually used to form the resin molded body 3. The molding condition when using nylon to form the resin molded body 3 is, e.g., a molding temperature of 150 to 300° C.

Meanwhile, in the present embodiment, the resin flows from the main body-molding portion 10a toward the front edge of the flange-molding portion 10b. Therefore, in case that the slit 8a of the collar 8 faces the main body 5 side, it is considered that a force is applied in a direction of stretching the collar 8 when the resin is injected and residual strain in the resin around the collar 8 causes molding defects. Therefore, in the resin molding process, it is desirable that the collar 8 be arranged so that the slit 8a does not face in the flowing direction of the resin.

After the resin injected from the first resin inlet 11 is cooled down, the mold 10 is removed and the excess resin cured in the outlet 12 and the resin reservoir 13 is scraped off, thereby obtaining the cable with resin molded body 1 in the present embodiment. Although FIG. 1B shows an example in which a weld 15 is formed on a side of the main body 5 opposite to the bolt hole 7, the formation position of the weld 15 varies depending on the shape, etc., of the resin molded body 3.

As described above, in the method of manufacturing a cable with resin molded body in the present embodiment, since the resin molded body 3 is molded by injecting a resin into the mold 10 having the outlet 12 formed on the flange-molding portion 10b on the bolt hole 7 side with respect to the main body-molding portion 10a to drain the resin, the resin is drained from the flange-molding portion 10b through the outlet located on the bolt hole 7 side with respect to the main body-molding portion 10a during resin molding of the resin molded body 3.

As a result, it is possible to ensure flowability of the resin around the bolt hole 7 and thereby to prevent a weld line from occurring around the bolt hole 7. In other words, in the present embodiment, it is possible to provide a method of manufacturing a cable with resin molded body which makes cracks less likely to occur when tightening a bolt.

Although the resin is injected from one gate in the present embodiment, two or more gates may be provided to inject the resin. For example, in the present embodiment, strain remains at the top end portion of the main body 5 distant from the first resin inlet 11 due to fall in temperature of the resin and may cause defects such as deformation. Such defects are likely to occur especially when the cooling effect of the mold 10 is significant, such as when a distance from the first resin inlet 11 to the top end portion of the main body 5 (a flow path of the injected resin) is long or when the surface area of the resin molded body 3 is large.

Figure 2:
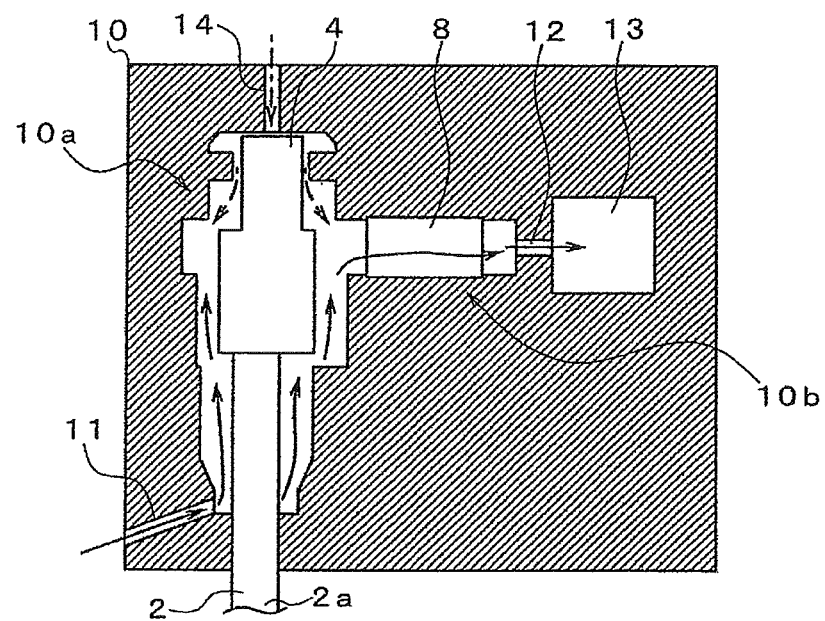
FIG. 2 is an illustration diagram showing a method of manufacturing a cable with resin molded body in a modification of the invention.

In case that such defects occur, a second resin inlet 14 may be formed on the top of the main body-molding portion 10a (an end portion opposite to the cable 2) as shown in FIG. 2 so that the resin is injected through the two resin inlets 11 and 14 to mold the resin molded body 3.

Figure 3:
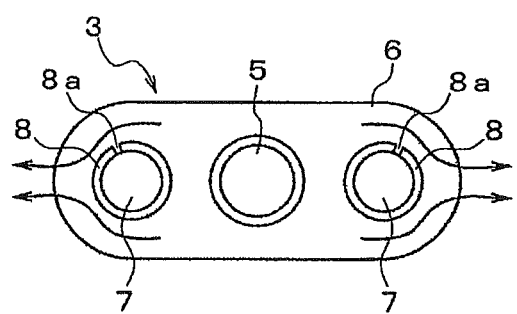
FIG. 3 is an illustration diagram showing a method of manufacturing a cable with resin molded body in another modification of the invention.
Figure 4A:
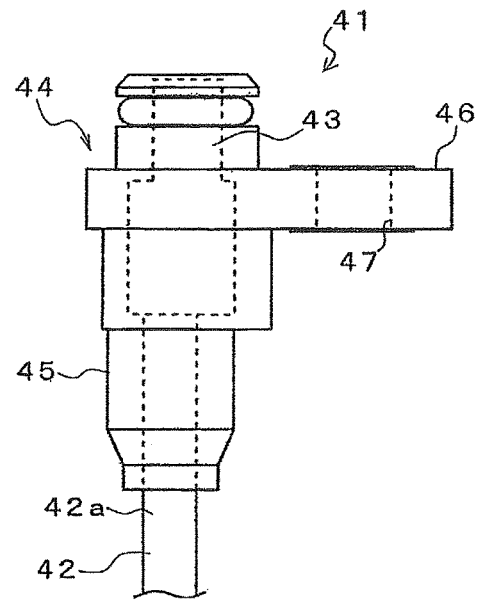
FIG. 4A is a side view showing the conventional cable with resin molded body.
Figure 4B:
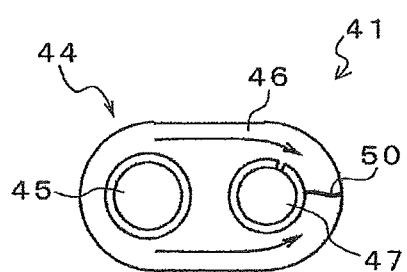
FIG. 4B is a top view the cable in FIG. 4A.
Figure 4C:
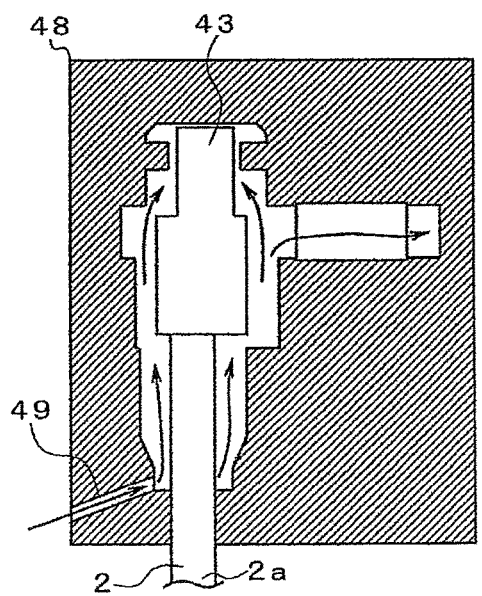
FIG. 4C is an illustration diagram showing the conventional method of manufacturing the cable with resin molded body.

Meanwhile, when the flange 6, which extends on both sides from the main body 5 and has two bolt holes 7 sandwiching the main body 5 as shown in FIG. 3, is formed by the method in which the resin is drained from only one end of the flange-molding portion 10b, a weld is formed around the bolt hole 7 located at another end. In such a case, outlets are formed at both ends of the flange-molding portion 10b so that the resin is drained from the both outlets.

Furthermore, although the case of providing waterproof properties by adhering the resin molded body 3 to the covering 2a of the cable 2 has been described in the present embodiment, resin inlets can be formed at any positions if waterproof properties are not required.

As such, the invention is not limited to the embodiment and it is obvious that the various kinds of modifications can be implemented without departing from the gist of the invention.

What is claimed is:

1. A method of manufacturing a cable with resin molded body, wherein the cable with resin molded body comprises a cable and a resin molded body formed by resin molding so as to cover a tip portion of the cable, wherein the resin molded body comprises a main body to cover the tip portion of the cable and a flange to fix the resin molded body to an attachment object, the flange being integrally molded with the main body, and wherein the flange comprises a bolt hole through which a bolt is inserted so as to fix the flange to the attachment object, the method comprising:

molding the resin molded body by injecting a resin into a mold, the mold comprising a main body-molding portion for molding the main body, a flange-molding portion for molding the flange, and an outlet formed in the flange-molding portion opposite to the main body-molding portion; and draining the resin through the outlet during the molding of the resin molded body, wherein the mold further comprises a first resin inlet formed at a position of a base end portion of the main body-molding portion corresponding to a covering of the molded cable, wherein the resin is injected through the first resin inlet into the mold during the molding of the resin molded body, wherein the flange-molding portion is formed on a bolt hole-side with respect to the main body-molding portion wherein a ring-shaped metal collar is provided along an inner peripheral surface of the bolt hole, and wherein the ring-shaped metal collar comprises a slit that does not face a flowing direction of the resin.

2. The method according to claim 1, wherein the outlet is formed in communication with a part of the flange-molding portion across the bolt hole from the main body-molding portion, and wherein the resin is drained through the outlet during the molding of the resin molded body.

3. The method according to claim 1, wherein the outlet has a diameter smaller than a thickness of the flange.

4. The method according to claim 1, wherein the outlet has a diameter of not more than 1 mm.

5. The method according to claim 1, wherein the outlet is formed at an intermediate position in a thickness direction of the flange-molding portion.

6. The method according to claim 1, wherein the mold further comprises a second resin inlet formed at a top end portion of the main body-molding portion opposite the cable, and wherein the resin is further injected through the second resin inlet into the mold during the molding of the resin molded body.

7. The method according to claim 1, wherein the resin molded body is formed so as to cover a periphery of a sensor at the tip portion of the cable.

8. The method according to claim 1, wherein the first resin inlet is formed on the main body-molding portion, and the resin injected from the first resin inlet flows from the main body-molding portion toward the flange-molding portion on the bolt hole-side.

9. The method according to claim 8, wherein a direction of the injecting of the resin through the first resin inlet is inclined toward a top end portion of the main body.

10. The method according to claim 1,
wherein the covering is welded to the resin molded body.

11. The method according to claim 1,
wherein the covering is adhered to the resin molded body.

12. The method according to claim 1, wherein the ring-shaped metal collar further comprises a rolled plate-shaped metal, and the slit is formed along a thickness direction of the flange.

13. The method according to claim 12, wherein the slit of the ring-shaped metal collar faces a side of the main body.

14. The method according to claim 1, wherein the mold includes a divided structure and the outlet includes grooves on divided surfaces of the mold.

15. The method according to claim 1, wherein the outlet and the main body-molding portion are located on opposing sides of the flange-molding portion.

16. The method according to claim 1, wherein, in a plan view, the flange-molding portion is located between the outlet and the main body-molding portion.

* * * * *